(12) United States Patent
Raz Goldfarb et al.

(10) Patent No.: US 12,117,891 B2
(45) Date of Patent: Oct. 15, 2024

(54) DEDUCING A ROOT CAUSE ANALYSIS MODEL FROM AUGMENTED REALITY PEER ASSISTANCE SESSIONS

(71) Applicant: International Business Machines Corporation, Armonk, NY (US)

(72) Inventors: Adi Raz Goldfarb, Akko (IL); Oded Dubovsky, Haifa (IL); Erez Lev Meir Bilgory, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 17/195,751

(22) Filed: Mar. 9, 2021

(65) Prior Publication Data

US 2022/0291981 A1 Sep. 15, 2022

(51) Int. Cl.
| | |
|---|---|
| *G06F 11/07* | (2006.01) |
| *G06F 18/2431* | (2023.01) |
| *G06N 20/00* | (2019.01) |
| *G06T 19/00* | (2011.01) |

(52) U.S. Cl.
CPC ........ *G06F 11/079* (2013.01); *G06F 18/2431* (2023.01); *G06N 20/00* (2019.01); *G06T 19/006* (2013.01)

(58) Field of Classification Search
CPC ... G06F 11/079; G06F 18/2431; G06N 20/00; G06T 19/006
See application file for complete search history.

(56) References Cited

U.S. PATENT DOCUMENTS

| | | |
|---|---|---|
| 7,529,465 B2 | 5/2009 | Barton et al. |
| 7,937,734 B2 | 5/2011 | Haddad |
| 8,204,317 B2 | 6/2012 | Barbieri et al. |
| 8,732,112 B2 | 5/2014 | Singh et al. |
| 8,761,029 B2 | 6/2014 | Ge et al. |
| 10,602,117 B1 | 3/2020 | Ct et al. |
| 10,628,518 B1 | 4/2020 | Silenceux |
| 11,263,207 B2 * | 3/2022 | Sylos ...................... G06F 40/30 |
| 11,403,540 B2 * | 8/2022 | Sanketi .................. G06N 5/048 |
| 11,710,145 B2 * | 7/2023 | Ranganathan ......... G06N 20/10 |
| | | 705/14.11 |
| 2003/0149586 A1 | 8/2003 | Chen et al. |

(Continued)

FOREIGN PATENT DOCUMENTS

| | | |
|---|---|---|
| AU | 2011352270 B2 | 7/2012 |
| CN | 102598055 A | 7/2012 |

(Continued)

OTHER PUBLICATIONS

Appendix P, List of IBM Patent Applications Treated as Related, Filed Herewith, 2 pages.

(Continued)

*Primary Examiner* — Haoshian Shih
(74) *Attorney, Agent, or Firm* — Stephen R. Yoder

(57) ABSTRACT

In an approach for deducing a root cause analysis model, a processor trains a classifier based on labeled data to identify entities. A processor trains the classifier with first taxonomy and ontology. A processor uses the classifier to classify each component from one or more augmented reality peer assistance sessions into a class. A processor generates a root cause analysis model based on the identified entities and the classified components.

20 Claims, 5 Drawing Sheets

(56) References Cited

U.S. PATENT DOCUMENTS

| | | | |
|---|---|---|---|
| 2008/0260115 | A1 | 10/2008 | Sinha et al. |
| 2008/0310709 | A1 | 12/2008 | Kender |
| 2010/0316359 | A1 | 12/2010 | Mally |
| 2011/0211812 | A1 | 9/2011 | Tzoukermann et al. |
| 2013/0132605 | A1 | 5/2013 | Kocks et al. |
| 2013/0218783 | A1 | 8/2013 | Anand |
| 2016/0173816 | A1 | 6/2016 | Huenerfauth et al. |
| 2018/0159979 | A1 | 6/2018 | Amir et al. |
| 2018/0299862 | A1 | 10/2018 | Zhao et al. |
| 2018/0324229 | A1 | 11/2018 | Ross et al. |
| 2019/0005833 | A1 | 1/2019 | Das et al. |
| 2019/0014884 | A1 | 1/2019 | Fu et al. |
| 2019/0130027 | A1* | 5/2019 | Maier ............... G06F 40/247 |
| 2019/0198013 | A1 | 6/2019 | Hirzel |
| 2019/0304188 | A1 | 10/2019 | Bridgeman et al. |
| 2019/0340200 | A1 | 11/2019 | Coimbra et al. |
| 2019/0347148 | A1 | 11/2019 | Gomes Pereira et al. |
| 2019/0392644 | A1 | 12/2019 | Keselman et al. |
| 2020/0026257 | A1 | 1/2020 | Dalal et al. |
| 2020/0043355 | A1 | 2/2020 | Kwatra |
| 2020/0079346 | A1 | 3/2020 | Payne et al. |
| 2020/0364723 | A1* | 11/2020 | Gitlevich ............ G06Q 30/016 |
| 2020/0394012 | A1* | 12/2020 | Wright, Jr. ............ G06F 3/011 |
| 2021/0019215 | A1* | 1/2021 | Neeter ............ G06Q 10/06316 |
| 2021/0064648 | A1 | 3/2021 | Farri et al. |
| 2021/0142188 | A1 | 5/2021 | Howard et al. |
| 2021/0264810 | A1 | 8/2021 | Johnson et al. |
| 2021/0365742 | A1 | 11/2021 | Wang et al. |
| 2021/0406047 | A1 | 12/2021 | Namburu et al. |

FOREIGN PATENT DOCUMENTS

| | | | |
|---|---|---|---|
| CN | 107924587 | A | 4/2018 |
| CN | 207319184 | U | 5/2018 |
| CN | 109840089 | A | 6/2019 |
| CN | 110019745 | A | 7/2019 |

OTHER PUBLICATIONS

Bilgory et al., "Automated Generation of Self-Guided Augmented Reality Session Plans From Remotely-Guided Augmented Reality Sessions", U.S. Appl. No. 17/073,354, filed Oct. 18, 2020, 36 pages.

Mell et al., "The NIST Definition of Cloud Computing", Recommendations of the National Institute of Standards and Technology, Special Publication 800-145, Sep. 2011, 7 pages.

Bhaskar Bhattacharya, "Automatic generation of augmented reality guided assembly instructions using expert demonstration", 2016 Graduate Theses and Dissertations, 15877 (Year: 2016), 194 Pages.

The State Intellectual Property Office of People's Republic of China, Notification of Grant Jul. 15, 2024, 2 Pages, CN Application No. 202111202243.

Dubovsky et al., "Automatic Generation of Content for Autonomic Augmented Reality Applications", U.S. Appl. No. 16/681,888, filed Nov. 13, 2019, 18 Pages. (Spec + Drawing).

Goldfarb et al., "Generation of Computer Vision Labels from Remotely-Assisted Augmented Reality Sessions", U.S. Appl. No. 17/020,856, filed Sep. 15, 2020, 28 Pages. (Spec + Drawing).

Limbua et al., "Using sensors and augmented reality to train apprentices using recorded expert performance: A systematic literature review," Educational Research Review, 2018, pp. 1-22, vol. 25.

Whitlock et al., "AuthAR: Concurrent Authoring of Tutorials for AR Assembly Guidance," Proceedings of Graphics Interface 2020: University of Toronto (2020), pp. 431-439.

\* cited by examiner

DEDUCING A ROOT CAUSE ANALYSIS MODEL FROM AUGMENTED REALITY PEER ASSISTANCE SESSIONS

BACKGROUND

The present disclosure relates generally to the field of root cause analysis, and more particularly to deducing a root cause analysis model from augmented reality peer assistance sessions.

Root cause analysis is a systematic process for identifying "root causes" of problems or events and an approach for responding to the problems. Root cause analysis may be based on a basic idea that effective management requires more than merely "putting out fires" for problems that develop but finding a way to prevent the problems. Root cause analysis may help pinpoint contributing factors to a problem or event. Augmented reality is an interactive experience of a real-world environment where the objects that reside in the real world are enhanced by computer-generated perceptual information. Enterprise companies nowadays start to leverage ways to improve their workers and especially field technicians' efficiency. One of the trending solutions include augmented reality peer assistance, an "over the shoulder" type of support, where the expert/peer, guides an inexperienced technician on how to troubleshoot or repair a problem.

SUMMARY

Aspects of an embodiment of the present disclosure disclose an approach for deducing a root cause analysis model. A processor trains a classifier based on labeled data to identify entities. A processor trains the classifier with first taxonomy and ontology. A processor uses the classifier to classify each component from one or more augmented reality peer assistance sessions into a class. A processor generates a root cause analysis model based on the identified entities and the classified components.

DETAILED DESCRIPTION

Figure 1:
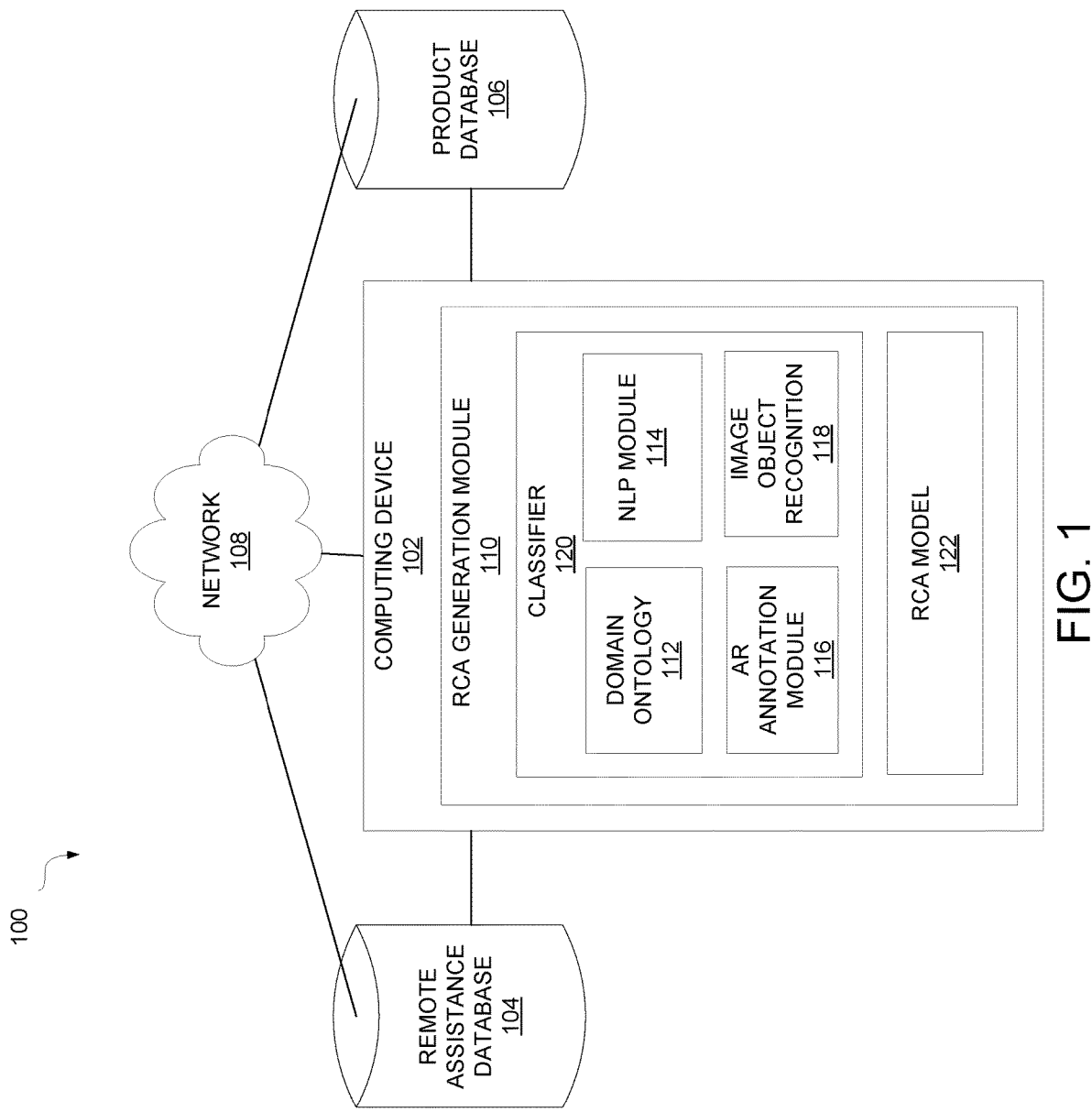
FIG. 1 is a functional block diagram illustrating a root cause analysis environment, in accordance with an embodiment of the present disclosure.

The present disclosure is directed to systems and methods for deducing a root cause analysis model from augmented reality peer assistance sessions.

Embodiments of the present disclosure recognize a need for identifying a root cause of a problem. A root cause analysis may require a good understanding of the domain of expertise. An expert may be commonly familiar with the symptoms and the possible scenarios that could point to a specific root cause of a problem. A less experienced technician would spend greater time on troubleshooting or reach out to an expert for advice in order to track and locate the root cause. Embodiments of the present disclosure recognize a need for building a root cause analysis model to cover different scenarios as much as possible. Embodiments of the present disclosure disclose leveraging and learning from augmented reality peer assistance sessions to deduce a root cause analysis model and to automatically extract nodes of the root cause analysis model to help building or enriching the root cause analysis model. The augmented reality peer assistance may be an "over the shoulder" type of support, where an expert/peer guides a less inexperienced technician on how to troubleshoot or repair a problem. The augmented reality peer assistance sessions may typically include images, videos, augmented reality annotations, 3-D graphics, text chats, natural conversations, and other suitable communications between the parties.

Embodiments of the present disclosure disclose using multi-modality data collected during technical augmented reality peer assistance sessions, most commonly during troubleshooting scenarios, to scale and automatically generate a root cause analysis model. Embodiments of the present disclosure disclose extracting the data from the information that is exchanged between the two parties. Embodiments of the present disclosure disclose an algorithm identifying and isolating the augmented reality peer assistance sessions' components into four types of components: (1) root causes, (2) symptoms, (3) instructions on how to inspect/verify a symptom, and (4) everything else. The algorithm may be based on the language of the domain and machine to identify entities in the augmented reality peer assistance sessions. Embodiments of the present disclosure disclose processing a batch of prerecorded peer guidance sessions through the algorithm to identify all mentioned symptoms, root causes, instructions, the order in which these were checked, to create an initial root cause analysis model (or partially populated model). After the model creation, when already in use, every new augmented reality peer assistance session may run through the algorithm to identify the same components, and continuously fine tune, adjust, and improve the root cause analysis model.

Embodiments of the present disclosure disclose using a domain and machine-type specific dictionary to learn the taxonomy of the machine and to identify the entities in the augmented reality peer assistance sessions. The entities may be parts in the machine, operations on these parts, states of the machine and parts (symptoms, problems). Embodiments of the present disclosure disclose collecting data (e.g., chat messages, voice captioning, augmented reality annotations, and images, ordered by time) from many remote assist sessions and training a generic model to classify the session data to different classes including instructions, symptoms, root causes, and others. The model may be generic enough to be mostly transferable between customers. The model may be based on a domain ontology. The domain ontology might be slightly different between customers. The model may be trained further for each customer.

Embodiments of the present disclosure disclose a method for automatically or semi-automatically creating a root cause analysis model. The model may get as input different symptoms, and output root causes. Embodiments of the present disclosure disclose using augmented reality peer assistance sessions for creating a root cause analysis model. Embodiments of the present disclosure disclose automatically extracting root causes and symptoms, and possibly other root cause analysis model required information from the augmented reality peer assistance sessions.

The present disclosure will now be described in detail with reference to the Figures. FIG. 1 is a functional block diagram illustrating a root cause analysis environment, generally designated 100, in accordance with an embodiment of the present disclosure.

In the depicted embodiment, root cause analysis environment 100 includes computing device 102, remote assistance database 104, product database 106, and network 108. In the depicted embodiment, remote assistance database 104 and product database 106 are located externally from computing device 102. Remote assistance database 104 and product database 106 may be accessed through a communication network such as network 108. Remote assistance database 104 and product database 106 may be accessed directly from computing device 102. In other embodiments, remote assistance database 104 and product database 106 may be located on computing device 102. In one or more embodiments, remote assistance database 104 stores various data collected from remote assistance sessions, e.g., augmented reality peer assistance sessions. For example, the data can include texts, augmented reality annotations, voices, images, videos, chats, conversations, camera poses and any other information from the remote assistance sessions. Product database 106 may store data outputted from root cause analysis (RCA) generation module 110 on computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to RCA generation module 110 and network 108 and is capable of processing program instructions and executing RCA generation module 110, in accordance with an embodiment of the present disclosure. Computing device 102 may include internal and external hardware components, as depicted and described in further detail with respect to FIG. 3.

Further, in the depicted embodiment, computing device 102 includes RCA generation module 110. In the depicted embodiment, RCA generation module 110 is located on computing device 102. However, in other embodiments, RCA generation module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and RCA generation module 110, in accordance with a desired embodiment of the disclosure.

In one or more embodiments, RCA generation module 110 is configured to train classifier 120 based on labeled data to identify entities. The labeled data may include annotated texts, captioned conversations, and augmented reality annotations. RCA generation module 110 may train classifier 120 based on taxonomy and ontology. There can be different types of root cause analysis models, for example decision trees, or Bayesian networks of causes and symptoms. Most models may need to contain the different symptoms and root causes. RCA generation module 110 may extract the data from the information that is exchanged between the two parties. RCA generation module 110 may collect data, e.g., chat messages, voice captioning, augmented reality annotations, and images, ordered by time, from many remote assist sessions and train a generic model to classify the session data one of the four classes, for example, instructions (e.g., "how to check something", "how to do") by detecting instruction by annotations (e.g., "push", "pull"), symptoms (e.g., "I see", "I hear", "It looks like"), root causes (e.g., "the problem was", "now it's working"), and others (e.g., "what's up?").

In one or more embodiments, RCA generation module 110 is configured to augment classifier 120 with customized taxonomy and ontology. RCA generation module 110 may augment classifier 120 based on additional labeled data from a customer. RCA generation module 110 may use a domain and machine-type specific dictionary to learn the taxonomy of a machine and to identify the entities in the augmented reality peer assistance sessions. For example, the entities may be parts in the machine, operations on these parts, states of the machine and parts (symptoms, problems). RCA generation module 110 may train classifier 120 generic enough to be mostly transferable between customers. Classifier 120 may be based on a pre-defined domain ontology. The pre-defined ontology might be slightly different between customers, and the root cause analysis model might be trained further for each customer. RCA generation module 110 may identify the entities referred to during the augmented reality peer assistance session based on the domain ontology. RCA generation module 110 may augment the entities in the domain ontology with customer-specific entities. RCA generation module 110 may train classifier 120 based on the augmented entities. RCA generation module 110 may train classifier 120 by applying natural language processing on the data. RCA generation module 110 may use the domain ontology and augmented reality labeling for the natural language processing. RCA generation module 110 may apply image object recognition on the data to train classifier 120. The entities may be recognized in the voice conversation between a local user (e.g., a technician) and a remote user (e.g., an expert), in a chat between them, and in the augmented reality annotations. Also, image recognition can be used to identify relevant entities such as spare parts that were replaced, or parts that were referred to during the remote assistance session.

In one or more embodiments, RCA generation module 110 is configured to use classifier 120 to classify each component from each augmented reality peer assistance session into a class. The class may be a symptom, a root cause, an instruction, and a miscellaneous item. RCA generation module 110 may identify and isolate the augmented reality peer assistance sessions' components into four type of components: (1) root causes, (2) symptoms, (3) instructions on how to inspect/verify a symptom, and (4) everything else. RCA generation module 110 may be based on the language of the domain and machine to identify entities in the augmented reality peer assistance sessions. RCA generation module 110 may identify the components to construct an automatically created (or a partially populated) root cause analysis model. For example: when an expert asks a field technician: "check the hard drive", in this case, RCA generation module 110 may use natural language processing techniques to detect the words "check" and "hard drive" and understand this is a symptom in the root cause analysis model. RCA generation module 110 may also leverage augmented reality annotation and the related actions (e.g., "open", "check", "close"), and, may use, for example, the "check" annotation type to assume a hypothesis of a symptom. RCA generation module 110 may classify all the stored remote assistance sessions from a customer enterprise asset management system. RCA generation module 110 may output the automatically collected data for a selected root cause analysis model. For example, root causes, symptoms, and some probabilities in a Bayesian model, or a decision tree created from many single paths on the decision tree, that are followed in each remote assistance session. RCA generation module 110 may automatically identify the symptoms and root causes. RCA generation module 110 may indicate probabilities that are collected from the data.

In one or more embodiments, RCA generation module 110 is configured to generate RCA model 122 based on the identified entities and the classified components with classifier 120. RCA model 122 may be a root cause analysis model, for example, a Bayesian model, a decision tree created from many single paths on the decision tree, or any other models suitable for root cause analysis. RCA generation module 110 may use the trained classifier 120 to classify a stored remote assistance session from a customer enterprise asset management system. RCA generation module 110 may use multi-modality data collected during technical augmented reality peer assistance sessions, for example, during troubleshooting scenarios, in order to automatically generate RCA model 122 or fine tune an existing root cause analysis model. RCA generation module 110 may output and store the classified data in product database 106.

In the depicted embodiment, RCA generation module 110 includes classifier 120 and RCA model 122. Classifier 120 includes domain ontology 112, natural language processing (NLP) module 114, augmented reality (AR) annotation module 116, and image objection recognition 118. In one or more embodiments, domain ontology 112 is configured to model domain-specific definitions of terms. RCA generation module 110 may use domain ontology 112 to learn the taxonomy of a machine and to identify entities in augmented reality peer assistance sessions. For example, the entities may be parts in the machine, operations on these parts, states of the machine and parts (symptoms, problems). RCA generation module 110 may generate classifier 120 generic enough to be mostly transferable between customers. Classifier 120 may be based on domain ontology 112. Domain ontology 112 may be slightly different between customers. RCA generation module 110 may further train classifier 120 based on different domain ontology 112 for each customer.

In one or more embodiments, NLP module 114 is configured to analyze and understand data associated with texts, messages, and languages from the augmented reality peer assistance sessions. RCA generation module 110 may collect data for to create RCA model 122 by applying natural language processing on the data. NLP module 114 may provide RCA generation module 110 based on the language of the domain and machine to identify entities in the augmented reality peer assistance sessions. RCA generation module 110 may identify components to be able to construct an automatically created (or a partially populated) root cause analysis model. For example: when an expert asks the field technician: "check the hard drive", on this case, RCA generation module 110 may use natural language processing techniques to detect the words "check" and "hard drive" and understand this is a symptom in the root cause analysis model. RCA generation module 110 may also leverage augmented reality annotation and the related actions (e.g., "open", "check", "close"), and, may use, for example, the "check" annotation type to assume a hypothesis of a symptom. RCA generation module 110 may classify all the stored remote assistance sessions from a customer enterprise asset management system. RCA generation module 110 may output the automatically collected data for a selected root cause analysis model. For example, root causes, symptoms, and some probabilities in a Bayesian model, or a decision tree created from many single paths on the decision tree, that are followed in each remote assistance session.

In one or more embodiments, AR annotation module 116 is configured to recognize augmented reality annotations from data from the augmented reality peer assistance sessions. AR annotation module 116 may provide input of augmented reality annotations to NLP module 114 for processing. RCA generation module 110 may use AR annotation module 116 to leverage augmented reality annotation and the related actions. AR annotation module 116 may provide RCA generation module 110 an annotation type to assume a hypothesis of a symptom. For example, AR annotation module 116 may correlate a natural language utterance to an AR label. AR annotation module 116 may correlate between entities or text in AR labels and the chat/conversation between a local user (e.g., a technician) and a remote user (e.g., an expert). In one or more embodiments, image object recognition 118 is configured to recognize images from a remote assistance session to find a sketch from the images and to correlate the sketch data with voices from conversations as another input to RCA generation module 110. Image object recognition 118 may recognize an image to use to identify entities that are related to AR labels. For example, if an AR annotation reads "replace" and circles/points to a microswitch, and image object recognition 118 may identify the relevant part in the image, the part circled by the AR annotation or pointed to by the AR annotation, is a microswitch, classifier 120 may know that 'microswitch' is potentially related to a root cause (by identifying 'replace' as related to a root cause, based on the training data). RCA generation module 110 may argument data input into NLU module 114 by entities identified by image object recognition module. For example, "that" can be replaced by 'pump' and 'replace that' becomes 'replace pump'.

Figure 2:
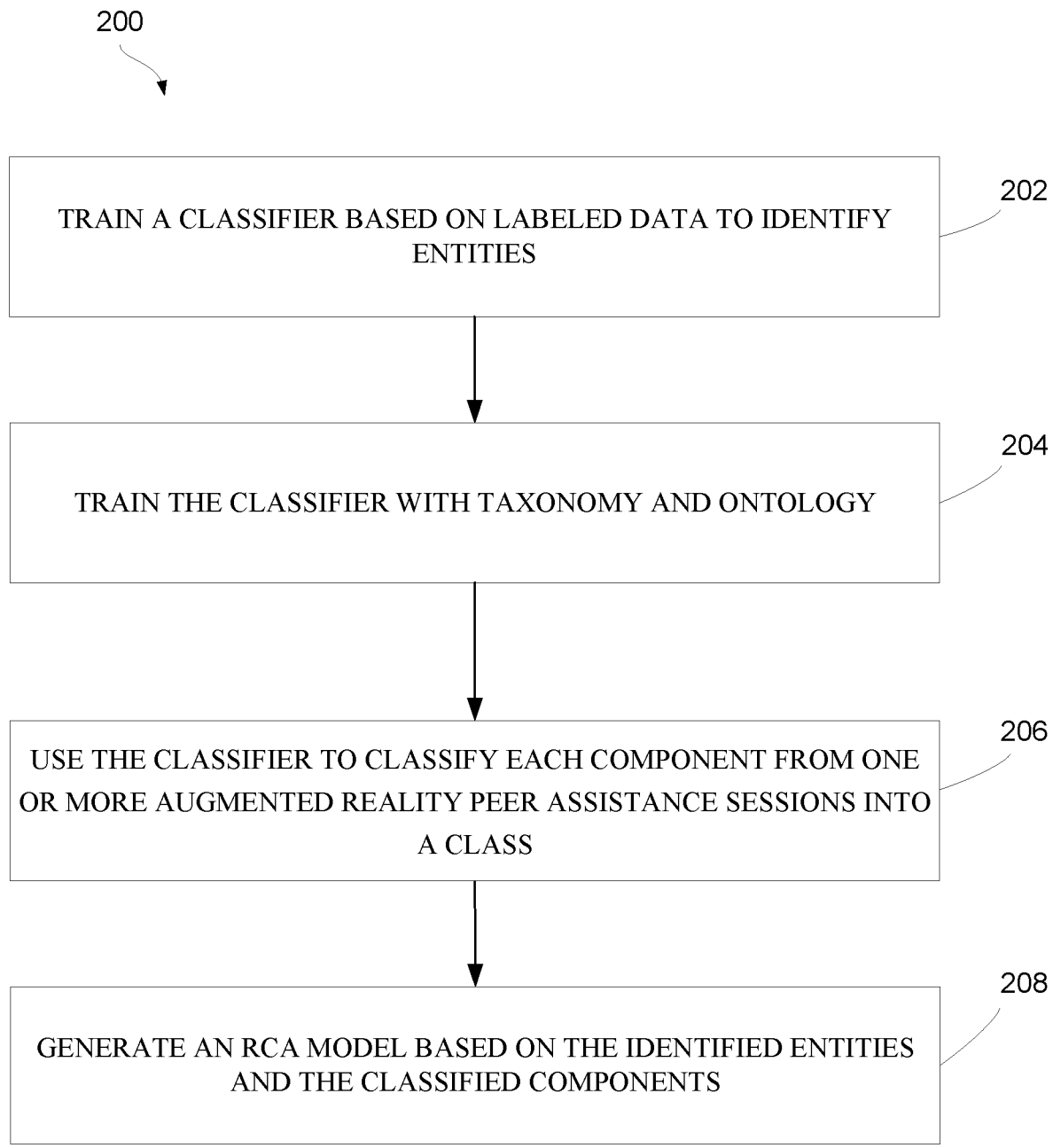
FIG. 2 is a flowchart depicting operational steps of a root cause analysis generation module within a computing device of FIG. 1, in accordance with an embodiment of the present disclosure.

FIG. 2 is a flowchart 200 depicting operational steps of RCA generation module 110 in accordance with an embodiment of the present disclosure.

RCA generation module 110 operates to train classifier 120 based on labeled data to identify entities. The labeled data may include annotated texts, captioned conversations, and augmented reality annotations. RCA generation module 110 also operates to augment classifier 120 with taxonomy and ontology. RCA generation module 110 operates to use classifier 120 to classify each component from each augmented reality peer assistance session into a class. RCA generation module 110 operates to generate RCA model 122 based on the identified entities and the classified components with classifier 120.

In step 202, RCA generation module 110 trains classifier 120 based on labeled data to identify entities. The labeled data may include annotated texts, captioned conversations, and augmented reality annotations. RCA generation module 110 may train classifier 120 based on taxonomy and ontology. There can be different types of root cause analysis models, for example decision trees, or Bayesian networks of causes and symptoms. Most models may need to contain the different symptoms and root causes. RCA generation module 110 may extract the data from the information that is exchanged between the two parties. RCA generation module 110 may collect data, e.g., chat messages, voice captioning, augmented reality annotations, and images, ordered by time, from many remote assist sessions and train a generic model to classify the session data one of the four classes, for example, instructions (e.g., "how to check something", "how to do") by detecting instruction by annotations (e.g., "push", "pull"), symptoms (e.g., "I see", "I hear", "It looks like"), root causes (e.g., "the problem was", "now it's working"), and others (e.g., "what's up?").

In step 204, RCA generation module 110 augments classifier 120 with customized taxonomy and ontology. RCA generation module 110 may augment classifier 120 based on additional labeled data from a customer. RCA generation module 110 may use a domain and machine-type specific dictionary to learn the taxonomy of a machine and to identify the entities in the augmented reality peer assistance sessions. For example, the entities may be parts in the machine, operations on these parts, states of the machine and parts (symptoms, problems). RCA generation module 110 may train classifier 120 generic enough to be mostly transferable between customers. Classifier 120 may be based on a pre-defined domain ontology. The pre-defined ontology might be slightly different between customers, and the root cause analysis model might be trained further for each customer. RCA generation module 110 may identify the entities referred to during the augmented reality peer assistance session based on the domain ontology. RCA generation module 110 may augment the entities in the domain ontology with customer-specific entities. RCA generation module 110 may train classifier 120 based on the augmented entities. RCA generation module 110 may train classifier 120 by applying natural language processing on the data. RCA generation module 110 may use the domain ontology and augmented reality labeling for the natural language processing. RCA generation module 110 may apply image object recognition on the data to train classifier 120. The entities may be recognized in the voice conversation between a local user (e.g., a technician) and a remote user (e.g., an expert), in a chat between them, and in the augmented reality annotations. Also, image recognition can be used to identify relevant entities such as spare parts that were replaced, or parts that were referred to during the remote assistance session.

In step 206, RCA generation module 110 uses classifier 120 to classify each component from each augmented reality peer assistance session into a class. The class may be a symptom, a root cause, an instruction, and a miscellaneous item. RCA generation module 110 may identify and isolate the augmented reality peer assistance sessions' components into four type of components: (1) root causes, (2) symptoms, (3) instructions on how to inspect/verify a symptom, and (4) everything else. RCA generation module 110 may be based on the language of the domain and machine to identify entities in the augmented reality peer assistance sessions. RCA generation module 110 may identify the components to construct an automatically created (or a partially populated) root cause analysis model. For example: when an expert asks a field technician: "check the hard drive", in this case, RCA generation module 110 may use natural language processing techniques to detect the words "check" and "hard drive" and understand this is a symptom in the root cause analysis model. RCA generation module 110 may also leverage augmented reality annotation and the related actions (e.g., "open", "check", "close"), and, may use, for example, the "check" annotation type to assume a hypothesis of a symptom. RCA generation module 110 may classify all the stored remote assistance sessions from a customer enterprise asset management system. RCA generation module 110 may output the automatically collected data for a selected root cause analysis model. For example, root causes, symptoms, and some probabilities in a Bayesian model, or a decision tree created from many single paths on the decision tree, that are followed in each remote assistance session. RCA generation module 110 may automatically identify the symptoms and root causes. RCA generation module 110 may indicate probabilities that are collected from the data.

In step 208, RCA generation module 110 generates RCA model 122 based on the identified entities and the classified components with classifier 120. RCA model 122 may be a root cause analysis model, for example, a Bayesian model, a decision tree created from many single paths on the decision tree, or any other models suitable for root cause analysis. RCA generation module 110 may use the trained classifier 120 to classify a stored remote assistance session from a customer enterprise asset management system. RCA generation module 110 may use multi-modality data collected during technical augmented reality peer assistance sessions, for example, during troubleshooting scenarios, in order to automatically generate RCA model 122 or fine tune an existing root cause analysis model. RCA generation module 110 may output and store the classified data in product database 106.

Figure 3:
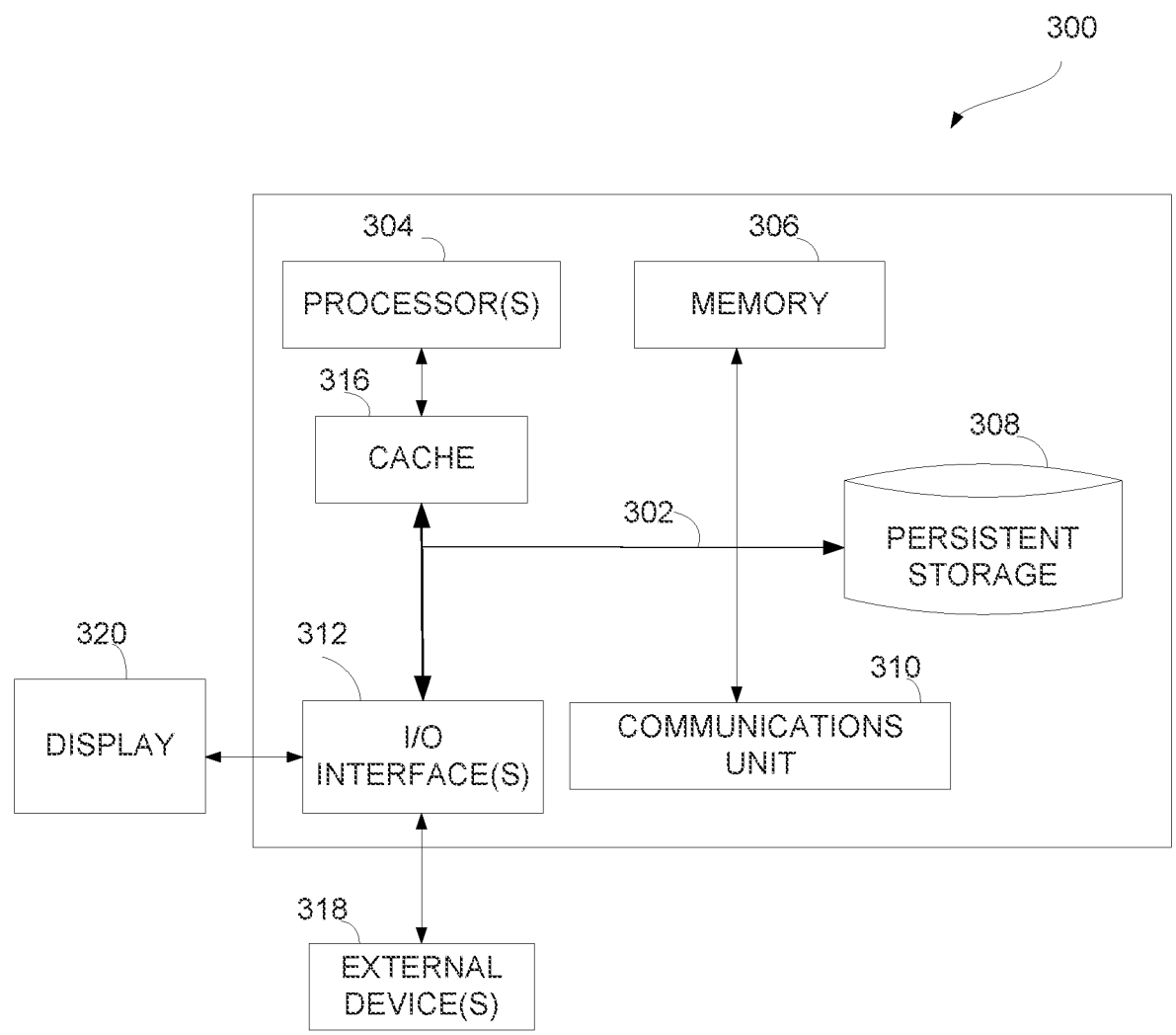
FIG. 3 is a block diagram of components of the computing device of FIG. 1, in accordance with an embodiment of the present disclosure.

FIG. 3 depicts a block diagram 300 of components of computing device 102 in accordance with an illustrative embodiment of the present disclosure. It should be appreciated that FIG. 3 provides only an illustration of one implementation and does not imply any limitations with regard to the environments in which different embodiments may be implemented. Many modifications to the depicted environment may be made.

Computing device 102 may include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

RCA generation module 110 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. RCA generation module 110 may be downloaded to persistent storage 308 through communications unit 310.

I/O interface(s) 312 allows for input and output of data with other devices that may be connected to computing device 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., RCA generation module 110 can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
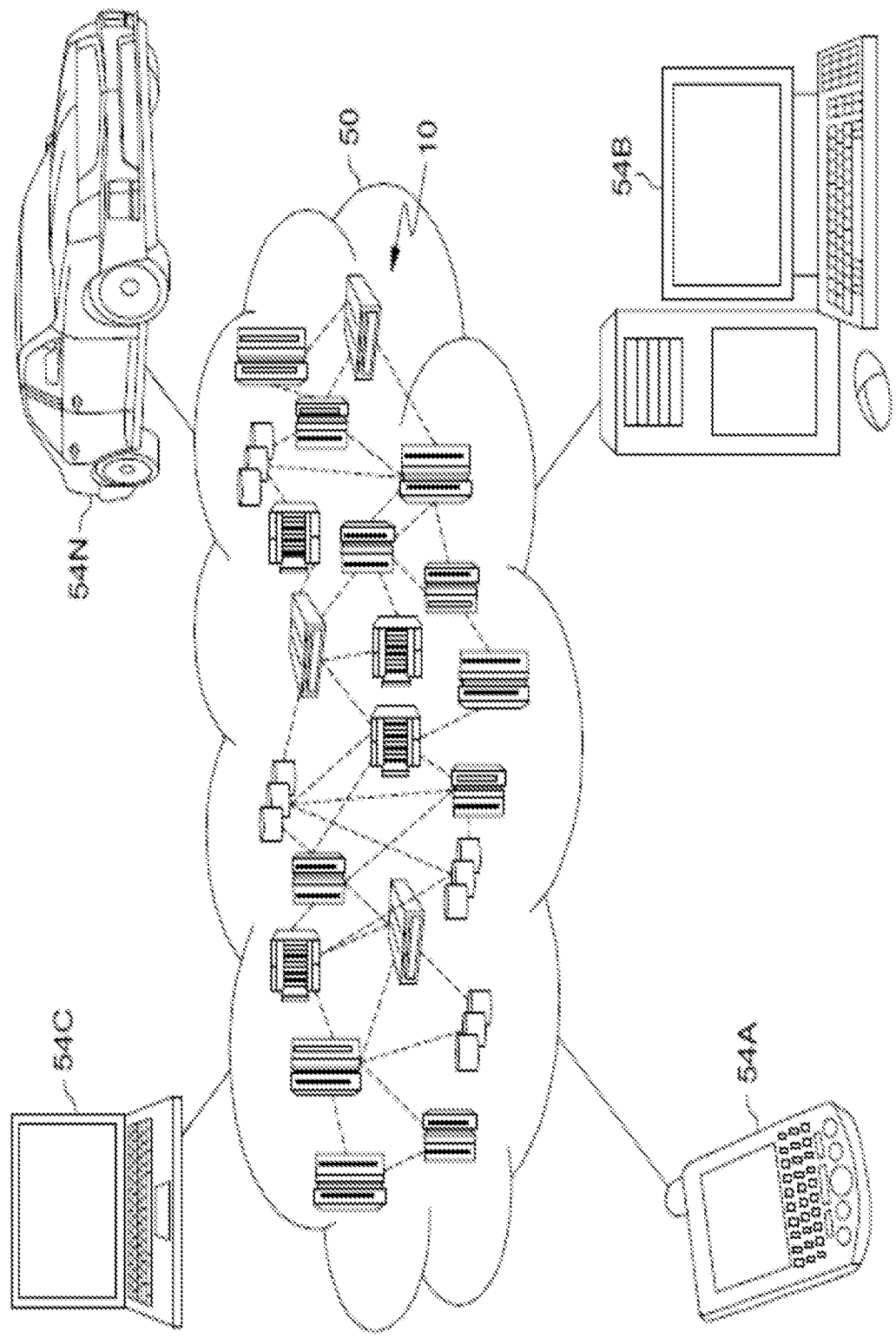
FIG. 4 depicts an embodiment of a cloud computing environment in accordance with the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
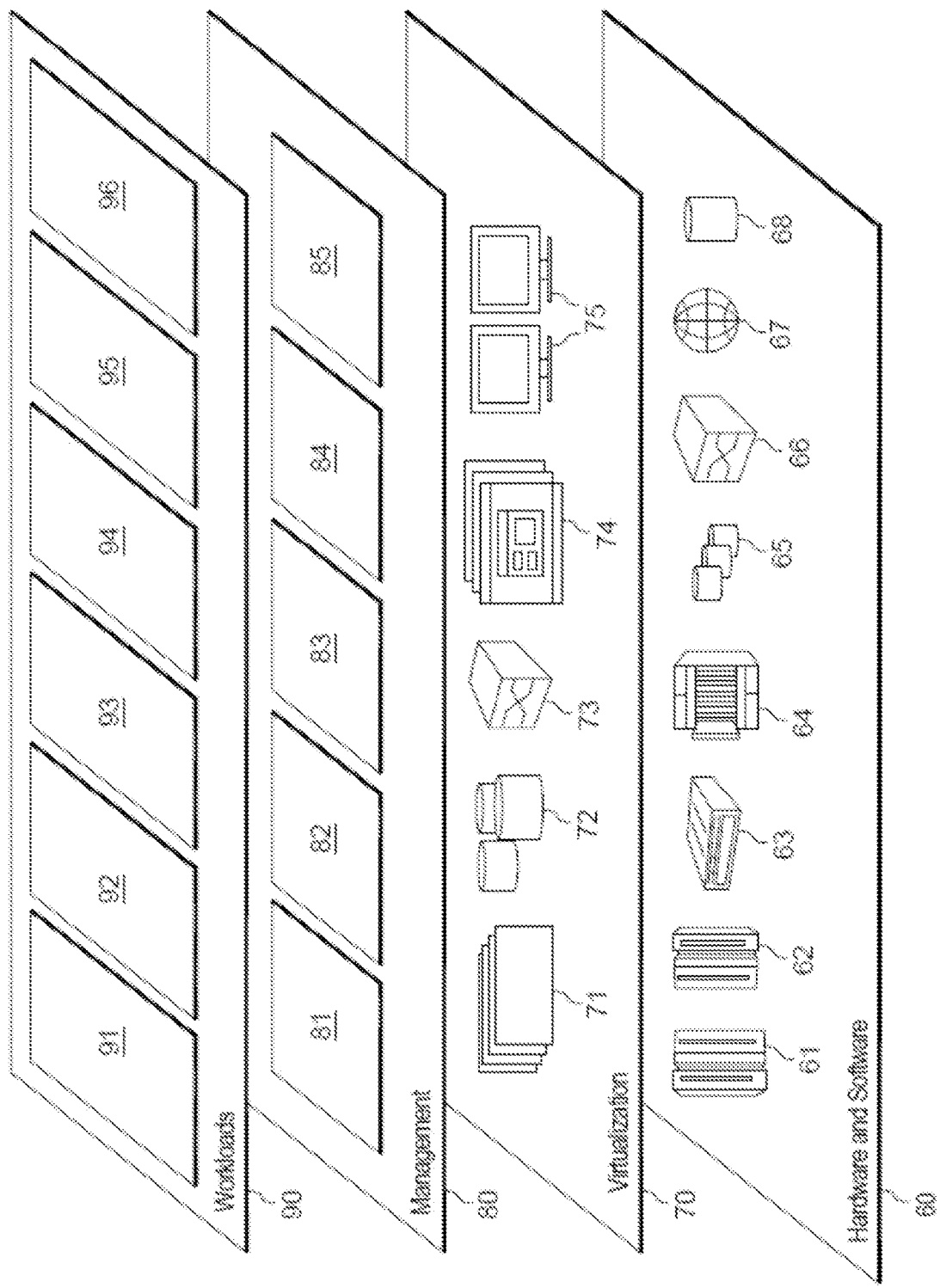
FIG. 5 depicts an embodiment of abstraction model layers of a cloud computing environment, in accordance with the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, RCA generation module 110 as described above with respect to root cause analysis environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   correlating information exchanged between two or more parties during a remote assistance session to one or more data labels;
   labeling the correlated information with corresponding data labels to create labeled data components;
   training a classifier based on the labeled data components to identify entities, wherein the step of training further comprises:
   extracting the labeled data components ordered by time from the correlated information;
   augmenting the trained classifier with a taxonomy and a pre-defined domain ontology;
   using the augmented classifier to classify each labeled data component into a class selected from the classes: (a) symptom; (b) root cause; (c) instruction; and (d) miscellaneous; and
   generating a root cause analysis (RCA) model based on the identified entities and the classified labeled data components.

2. The computer-implemented method of claim 1, further comprising:
   augmenting the classifier based on a second taxonomy and a second domain-specific ontology; and
   augmenting the classifier based on additional labeled data from a user.

3. The computer-implemented method of claim 1, further comprising:
   using the classifier to classify the remote assistance session stored in the customer enterprise asset management system; and
   adjusting the RCA model based on the remote assistance session.

4. The computer-implemented method of claim 1, further comprising:
   augmenting the entities in a domain ontology based on customer-specific entities; and
   training the classifier based on the augmented entities.

5. The computer-implemented method of claim 1, wherein the labeled data includes annotated texts, captioned conversations, and augmented reality annotations.

6. The computer-implemented method of claim 1, wherein the class is selected from the group consisting of: a symptom, a root cause, an instruction, and a miscellaneous item.

7. The computer-implemented method of claim 1, wherein each component is selected from the group consisting of: an utterance, an augmented reality annotation, a voice, an image, and a video.

8. A computer program product comprising:
one or more computer readable storage media, and program instructions collectively stored on the one or more computer readable storage media, the program instructions comprising:
program instructions to correlate information exchanged between two or more parties during a remote assistance session to one or more data labels;
program instructions to label the correlated information with corresponding data labels to create labeled data components;
program instructions to train a classifier based on the labeled data components to identify entities, wherein the step of training further comprises:
program instructions to extract the labeled data components ordered by time from the correlated information;
program instructions to augment the trained classifier with a taxonomy and a pre-defined domain ontology;
program instructions to use the augmented classifier to classify each labeled data component into a class selected from the classes: (a) symptom; (b) root cause; (c) instruction; and (d) miscellaneous; and
program instructions to generate a root cause analysis (RCA) model based on the identified entities and the classified labeled data components.

9. The computer program product of claim 8, the program instructions further comprising:
program instructions to augment the classifier based on second taxonomy and ontology; and
program instructions to augment the classifier based on additional labeled data from a user.

10. The computer program product of claim 8, the program instructions further comprising:
program instructions to use the classifier to classify the remote assistance session stored in the customer enterprise asset management system; and
program instructions to adjust the RCA model based on the stored remote assistance session.

11. The computer program product of claim 8, the program instructions further comprising:
program instructions to augment the entities in a domain ontology based on customer-specific entities; and
program instructions to train the classifier based on the augmented entities.

12. The computer program product of claim 8, wherein the labeled data includes annotated texts, captioned conversations, and augmented reality annotations.

13. The computer program product of claim 8, wherein the class is selected from the group consisting of: a symptom, a root cause, an instruction, and a miscellaneous item.

14. The computer program product of claim 8, wherein each component is selected from the group consisting of: an utterance, an augmented reality annotation, a voice, an image, and a video.

15. A computer system comprising:
one or more computer processors, one or more computer readable storage media, and program instructions stored on the one or more computer readable storage media for execution by at least one of the one or more computer processors, the program instructions comprising:
program instructions to correlate information exchanged between two or more parties during a remote assistance session to one or more data labels;
program instructions to label the correlated information with corresponding data labels to create labeled data components;
program instructions to train a classifier based on the labeled data components to identify entities, wherein the step of training further comprises:
program instructions to extract the labeled data components ordered by time from the correlated information;
program instructions to augment the trained classifier with a taxonomy and a pre-defined domain ontology;
program instructions to use the augmented classifier to classify each labeled data component into a class selected from the classes: (a) symptom; (b) root cause; (c) instruction; and (d) miscellaneous; and
program instructions to generate a root cause analysis (RCA) model based on the identified entities and the classified labeled data components.

16. The computer system of claim 15, the program instructions further comprising:
program instructions to augment the classifier based on second taxonomy and ontology; and
program instructions to augment the classifier based on additional labeled data from a user.

17. The computer system of claim 15, the program instructions further comprising:
program instructions to use the classifier to classify the remote assistance session in the customer enterprise asset management system; and
program instructions to adjust the RCA model based on the remote assistance session.

18. The computer system of claim 15, the program instructions further comprising:
program instructions to augment the entities in a domain ontology based on customer-specific entities; and
program instructions to train the classifier based on the augmented entities.

19. The computer system of claim 15, wherein the labeled data includes annotated texts, captioned conversations, and augmented reality annotations.

20. The computer system of claim 15, wherein the class is selected from the group consisting of: a symptom, a root cause, an instruction, and a miscellaneous item.

* * * * *